US012805426B2

(12) United States Patent
Stoller et al.

(10) Patent No.: US 12,805,426 B2
(45) Date of Patent: Nov. 24, 2026

(54) FLUID CONTROL SYSTEM

(71) Applicant: Precision Planting LLC, Tremont, IL (US)

(72) Inventors: Jason Stoller, Eureka, IL (US); Jeremy Hodel, Morton, IL (US)

(73) Assignee: Precision Planting PLLC, Tremont, IL (US)

( * ) Notice: Subject to any disclaimer, the term of this patent is extended or adjusted under 35 U.S.C. 154(b) by 274 days.

(21) Appl. No.: 18/825,236

(22) Filed: Sep. 5, 2024

(65) Prior Publication Data

US 2024/0423117 A1 Dec. 26, 2024

Related U.S. Application Data

(63) Continuation of application No. 16/978,689, filed as application No. PCT/US2019/021416 on Mar. 8, 2019, now abandoned.

(Continued)

(51) Int. Cl.
*A01C 7/20* (2006.01)
*A01B 63/111* (2006.01)
(Continued)

(52) U.S. Cl.
CPC ............ *A01C 7/203* (2013.01); *A01B 63/111* (2013.01); *A01C 5/068* (2013.01); *A01C 7/006* (2013.01); *A01C 7/205* (2013.01)

(58) Field of Classification Search
CPC ........ A01B 63/008; A01B 63/24; A01B 63/32; A01B 63/111; A01C 5/068; A01C 7/006; A01C 7/203; A01C 7/205
See application file for complete search history.

(56) References Cited

U.S. PATENT DOCUMENTS 6,701,857 B1 3/2004 Jensen et al.
8,522,889 B2 * 9/2013 Adams ................ A01B 61/048 111/163

(Continued)

FOREIGN PATENT DOCUMENTS

CA 3003996 A1 * 11/2018 ............ A01C 7/205
DE 10330869 A1 2/2005

(Continued)

OTHER PUBLICATIONS

European Patent Office, Search Report for related PCT Application No. PCT/US19/21416, dated May 14, 2019, 11 pages.

(Continued)

*Primary Examiner* — Adam J Behrens

(57) ABSTRACT

A fluid control system for supplying fluid to multiple actuators associated with different implements disposed on an agricultural planter row unit. A first one of the multiple actuators is associated with a first implement disposed on the agricultural planter row unit. A second one of the multiple actuators is associated with a second implement disposed on the agricultural planter row unit. The fluid control system controls fluid flow from a fluid source to each of the first and second actuators. In one embodiment, the fluid control system includes an inlet valve, an outlet valve and a pressure sensor, wherein the inlet valve is in fluid communication with the fluid source and the pressure sensor is disposed to measure fluid pressure in a fluid line in fluid communication with the inlet valve and each of the first and second actuators.

11 Claims, 7 Drawing Sheets

Related U.S. Application Data

(60) Provisional application No. 62/640,252, filed on Mar. 8, 2018.

(51) Int. Cl.
*A01C 5/06* (2006.01)
*A01C 7/00* (2006.01)

(56) References Cited

U.S. PATENT DOCUMENTS

| | | | | |
|---|---|---|---|---|
| 8,550,020 | B2 | 10/2013 | Sauder et al. | |
| 8,561,472 | B2 | 10/2013 | Sauder et al. | |
| 9,107,337 | B2 * | 8/2015 | Bassett | A01B 71/02 |
| 9,232,687 | B2 * | 1/2016 | Bassett | A01C 7/203 |
| 9,332,689 | B2 | 5/2016 | Baurer et al. | |
| 9,854,724 | B2 * | 1/2018 | Adams | A01C 5/066 |
| 9,864,094 | B2 | 1/2018 | Stoller et al. | |
| 10,932,405 | B2 | 3/2021 | Koch et al. | |
| 12,102,030 | B2 * | 10/2024 | Kowalchuk | A01B 63/008 |
| 12,290,020 | B2 * | 5/2025 | Bassett | A01B 79/005 |
| 2005/0051025 | A1 | 3/2005 | Nielsen et al. | |
| 2005/0072954 | A1 | 4/2005 | Nielsen | |
| 2012/0046160 | A1 | 2/2012 | Crocker et al. | |
| 2013/0126023 | A1 | 5/2013 | Huynh et al. | |
| 2013/0248212 | A1 | 9/2013 | Bassett | |
| 2014/0090585 | A1 | 4/2014 | Sauder et al. | |
| 2015/0013322 | A1 | 1/2015 | Ito et al. | |
| 2015/0094916 | A1 | 4/2015 | Bauerer et al. | |
| 2016/0128265 | A1 | 5/2016 | Bassett | |
| 2016/0157412 | A1 | 6/2016 | Sauder et al. | |
| 2017/0359940 | A1 | 12/2017 | Bassett | |
| 2019/0075710 | A1 | 3/2019 | Strnad et al. | |
| 2020/0068783 | A1 * | 3/2020 | Strnad | A01B 76/00 |

FOREIGN PATENT DOCUMENTS

| | | | |
|---|---|---|---|
| DE | 102006057782 | B4 | 3/2016 |
| GB | 2298291 | B | 6/1998 |

OTHER PUBLICATIONS

European Patent Office, Search Report for related EP Application No. EP19763360, dated Mar. 17, 2021, 11 pages.

European Patent Office, Search Report for related EP Application No. EP23164776, dated May 30, 2023, 06 pages.

* cited by examiner

FLUID CONTROL SYSTEM

CROSS REFERENCE TO RELATED APPLICATIONS

This application is a continuation of U.S. patent application Ser. No. 16/978,689 filed Sep. 5, 2020, which is the U.S. National Stage of PCT Application No. PCT/US2019/021416 filed Mar. 8, 2019, which claims the benefit of U.S. Provisional Application No. 62/640,252 filed Mar. 8, 2018, each of which is incorporated herein in its entirety by reference.

BACKGROUND

There is a need for a fluid control system for supply fluid to multiple actuators associated with different implements on an agricultural planter row unit. While fluid may be supplied individually to each actuator associated with each implement on the row unit, it would be a benefit if a single fluid control system supplied fluid to multiple actuators for actuating each of the different implements on the row unit.

DESCRIPTION

All references to patents and patent publications cited herein are incorporated herein in their entireties. If there is a discrepancy or conflict between definitions or descriptions of elements of any patents or printed publications incorporated by reference with definitions or descriptions of elements referred to in this specification, the definitions or descriptions expressly set forth in this specification shall control.

Figure 1:
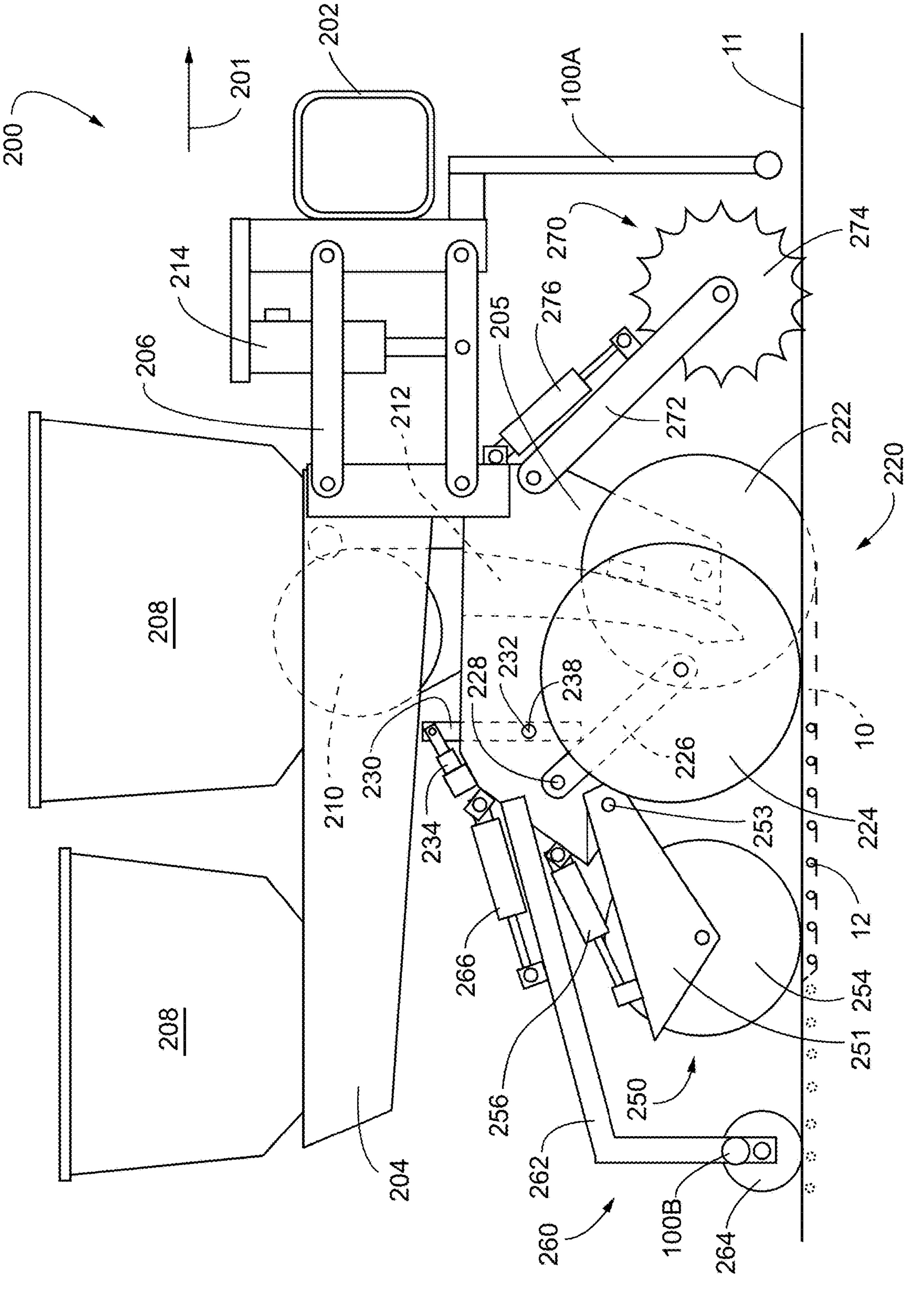
FIG. 1 is a side elevation view of an embodiment of a row unit of an agricultural planter.

Referring now to the drawings, wherein like reference numerals designate identical or corresponding parts throughout the several views, FIG. 1 illustrates an embodiment of an agricultural planter row unit 200. The row unit 200 is comprised of a frame 204 pivotally connected to a toolbar 202 by a parallel linkage 206 enabling each row unit 200 to move vertically independently of the toolbar 202. The frame 204 operably supports one or more hoppers 208, a seed meter 210, a seed delivery mechanism 212, an optional downforce control system 214, a seed trench opening assembly 220, a trench closing assembly 250, an optional packer wheel assembly 260, and an optional row cleaner assembly 270. It should be understood that the row unit 200 shown in FIG. 1 may be for a conventional planter or the row unit 200 may be a central fill planter, in which the hoppers 208 may be replaced with one or more mini-hoppers and the frame 204 modified accordingly as would be recognized by those of skill in the art.

The optional downforce control system 214 includes an actuator having one end operably coupled relative to the toolbar 202 and another end operably coupled to the parallel linkage to apply lift and/or downforce on the row unit 200 such as disclosed in U.S. Publication No. US2014/0090585. The downforce control system 214 may be referred to as a downforce implement 214 of the row unit 200.

The seed trench opening assembly 220 includes a pair of opening discs 222 rotatably supported by a downwardly extending shank member 205 of the frame 204. The opening discs 222 are arranged to diverge outwardly and rearwardly so as to open a v-shaped trench 10 in the soil 11 as the planter traverses the field. The seed delivery mechanism 212, such as a seed tube or seed conveyor, is positioned between the opening discs 222 to deliver seed from the seed meter 210 into the opened seed trench 10. The depth of the seed trench 10 is controlled by a pair of gauge wheels 224 positioned adjacent to the opening discs 222. The gauge wheels 224 are rotatably supported by gauge wheel arms 226 which are pivotally secured at one end to the frame 204 about pivot pin 228. A rocker arm 230 is pivotally supported on the frame 204 by a pivot pin 232. It should be appreciated that rotation of the rocker arm 230 about the pivot pin 232 sets the depth of the trench 10 by limiting the upward travel of the gauge wheel arms 226 (and thus the gauge wheels) relative to the opening discs 222. The rocker arm 230 may be adjustably positioned via a linear actuator 234 mounted to the row unit frame 204 and pivotally coupled to an upper end of the rocker arm 230. The linear actuator 234 may be controlled remotely or automatically actuated as disclosed, for example, in International Publication No. WO2014/186810. The adjustably positional rocker arm 230 may be referred to as a depth adjustment implement 230 of the row unit 200.

An optional downforce sensor 238 is configured to generate a signal related to the amount of force imposed by the gauge wheels 224 on the soil. In some embodiments, the pivot pin 232 for the rocker arm 230 may comprise the downforce sensor 238, such as the instrumented pins disclosed in U.S. Pat. No. 8,561,472.

An optional seed meter 210 may be any commercially available seed meter, such as a finger-type meter or vacuum seed meter. An exemplary embodiment of one type of vacuum seed meter is the VSet® meter, available from Precision Planting LLC, 23207 Townline Rd, Tremont, IL 61568.

The seed trench closing assembly 250 includes a frame member 251 that is pivotally attached at its forward end to the row unit frame 204 by a pivot 253. The frame member 251 rotatably supports a pair of closing wheels 254 which are disposed on opposing sides of the open seed trench 10. The closing wheels 254 are supported from the frame member 251 at an angle with respect to the forward direction of travel of the row unit 200 indicated by arrow 201 to push the soil inwardly from each side of the open seed trench to close the open seed trench with soil covering the seed previously deposited in the seed trench. An actuator 256 is supported at one end from the row unit frame 200 and is connected at the other end to the frame member 251 to vary the amount of downforce applied to the closing assembly 250. The seed trench closing assembly 250 may be referred to as a trench closing implement 250 of the row unit 200.

An optional packer wheel assembly 260 comprises an arm 262 pivotally attached to the row unit fame 204 and extends rearward of the closing wheel assembly 250 and in alignment therewith. The arm 262 rotatably supports a packer wheel 264. An actuator 266 is pivotally attached at one end to the arm 262 and at its other end to the row unit frame 204 to vary the amount of downforce exerted by the packer wheel 264 to pack the soil over the seed trench 10. The packer wheel assembly 260 may be referred to as a packer wheel implement 260 of the row unit 200.

An optional row cleaner assembly 270 may be the CleanSweep® system available from Precision Planting LLC, 23207 Townline Rd, Tremont, IL 61568. The row cleaner assembly 270 includes an arm 272 pivotally attached to the forward end of the row unit frame 204 and aligned with the trench opening assembly 220. A pair of row cleaner wheels 274 are rotatably attached to the forward end of the arm 272. An actuator 276 is pivotally attached at one end to the arm 272 and at its other end to the row unit frame 204 to adjust the downforce on the arm to vary the aggressiveness of the action of the row cleaning wheels 274 depending on the amount of crop residue and soil conditions. The row cleaner assembly 270 may be referred to as a row cleaner implement 270 of the row unit 200.

Figure 2:
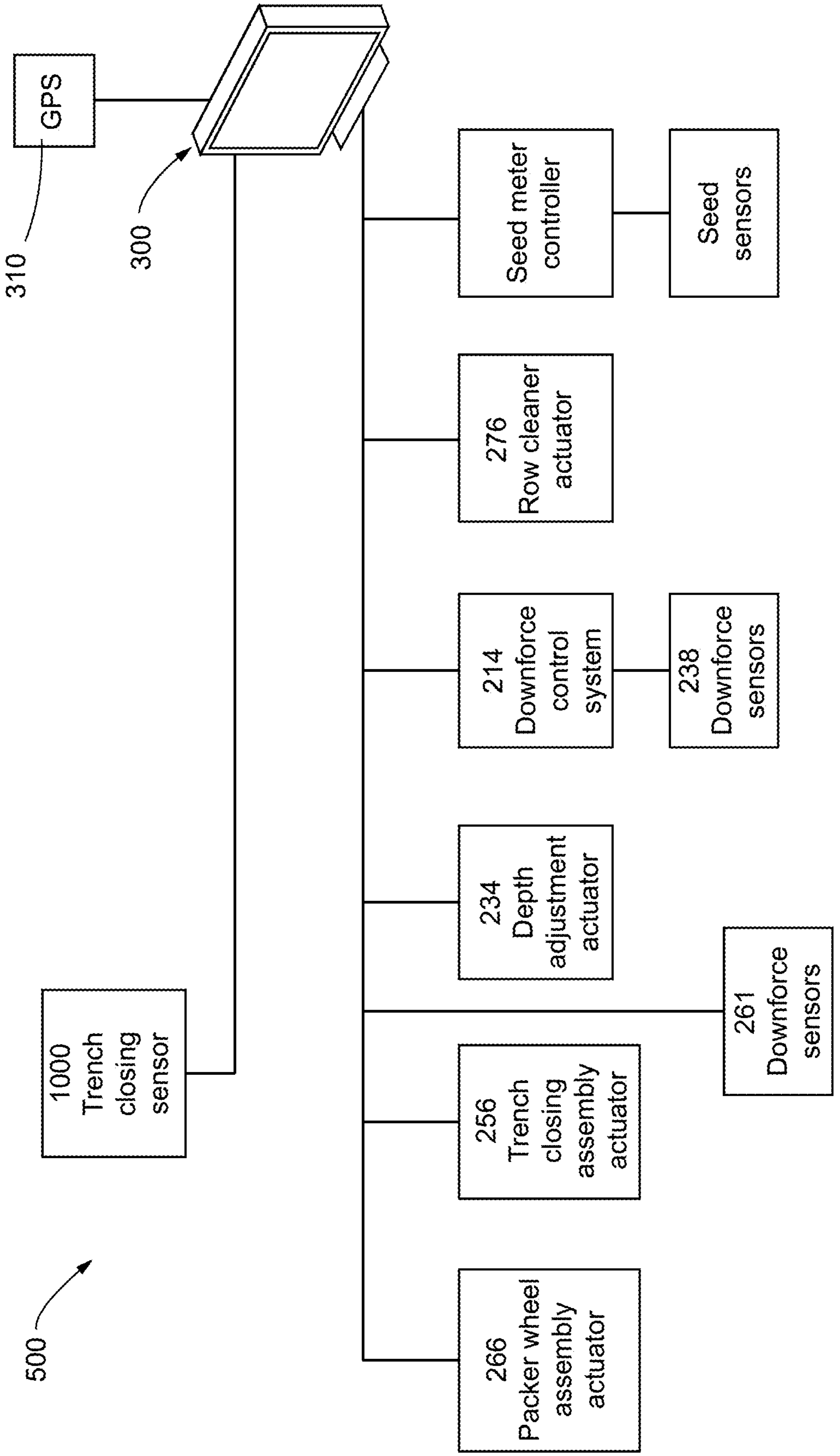
FIG. 2 is a diagram of an embodiment of a system for implementing operational control of the implements on a row unit.

Referring to FIG. 2, a monitor 300 is visible to an operator within the cab of a tractor pulling the planter. The monitor 300 may be in signal communication with a GPS unit 310, the trench closing assembly actuator 256 and the optional packer wheel assembly actuator 266 to enable operational control of the trench closing assembly 250 and the optional packer wheel assembly 260 based on the signals generated by trench closing sensors 1000 such as those described in International Publication No. WO2017/197274. Also as discussed later, the monitor 300 may be programmed to display operational recommendations based on the signals generated by the trench closing sensors 1000. The monitor 300 may also be in signal communication with the row cleaner actuator 276, the downforce control system 214, the depth adjustment actuator 234 so as to enable operational control of the row cleaner assembly 270, the downforce control system 214, and the trench opening assembly 230, respectively.

Fluid Control System

As used herein, the term fluids includes gases or liquids. Examples of fluids include, but are not limited to, air and hydraulic fluid.

Figure 3:
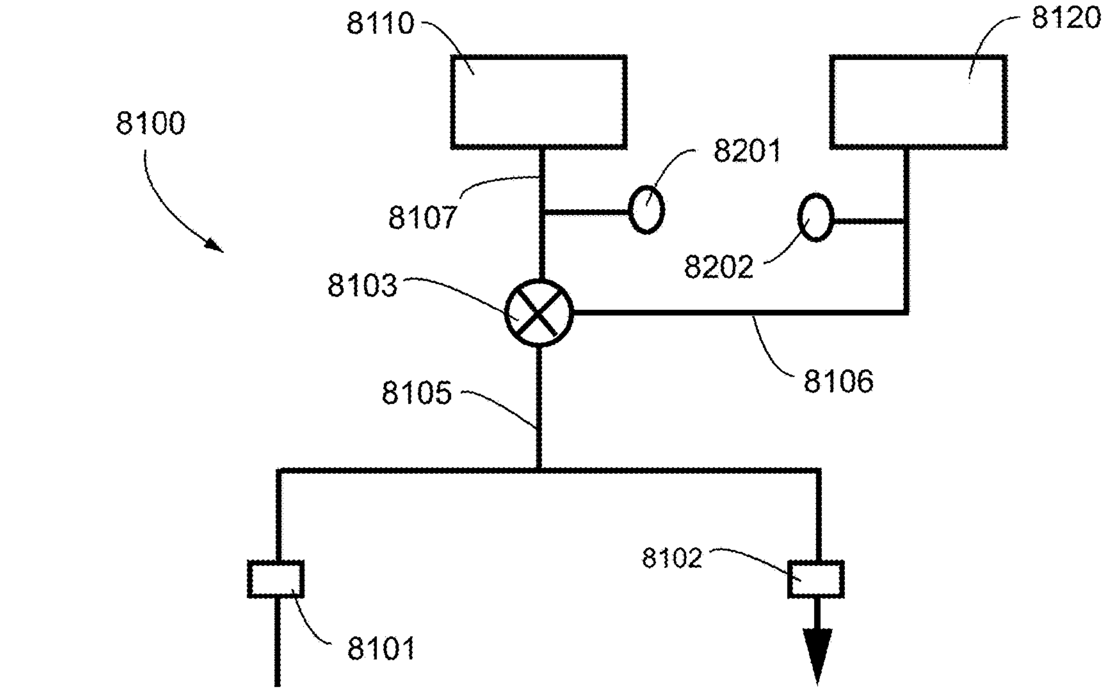
FIG. 3 is a schematic illustration of an embodiment of a fluid control system for two actuators.

Illustrated in FIG. 3 is an embodiment of a fluid control system 8100 wherein a common supply of fluid is used to supply fluid for actuation of multiple actuators associated with two or more implements on each row unit 200. In this embodiment, fluid flow to and from a first actuator 8110 and a second actuator 8120 is controlled by fluid control system 8100. In one example of the embodiment of the fluid control system 8100, the first actuator 8110 may be actuator 256, and the second actuator 8120 may be actuator 266 of the row unit 200 of FIG. 1. The fluid control system 8100 includes an inlet valve 8101, an outlet valve 8102, and a first control valve 8103. Inlet valve 8101 and outlet valve 8102 may be solenoid valves. The first control valve 8103 may be a multichannel valve that allows flow to one or both of the first actuator 8110 and the second actuator 8120. If additional fluid is needed for the second actuator 8120 to increase the force applied, outlet valve 8102 is closed, inlet valve 8101 is open, and first control valve 8103 is operated to provide fluid communication from line 8105 to line 8106 and to close communication to line 8107. If fluid needs to be removed from first actuator 8110 to decrease the force applied, outlet valve 8102 is open, inlet valve 8101 is closed, and first control valve 8103 is operated to provide fluid communication from line 8107 to line 8105 and to close fluid communication to line 8106. After flowing through outlet valve 8102, the fluid can be returned to a source (not shown) or vented to atmosphere (for gases). To measure the amount of pressure applied to the first actuator 8110, a first pressure sensor 8201 is connected to line 8107. When first control valve 8103 is closed to line 8107, the pressure in the first actuator 8110 can be measured. To measure the amount of pressure applied to the second actuator 8120, a second pressure sensor 8202 is connected to line 8106. When first control valve 8103 is closed to line 8106, the pressure in the second actuator 8120 can be measured.

Figure 4:
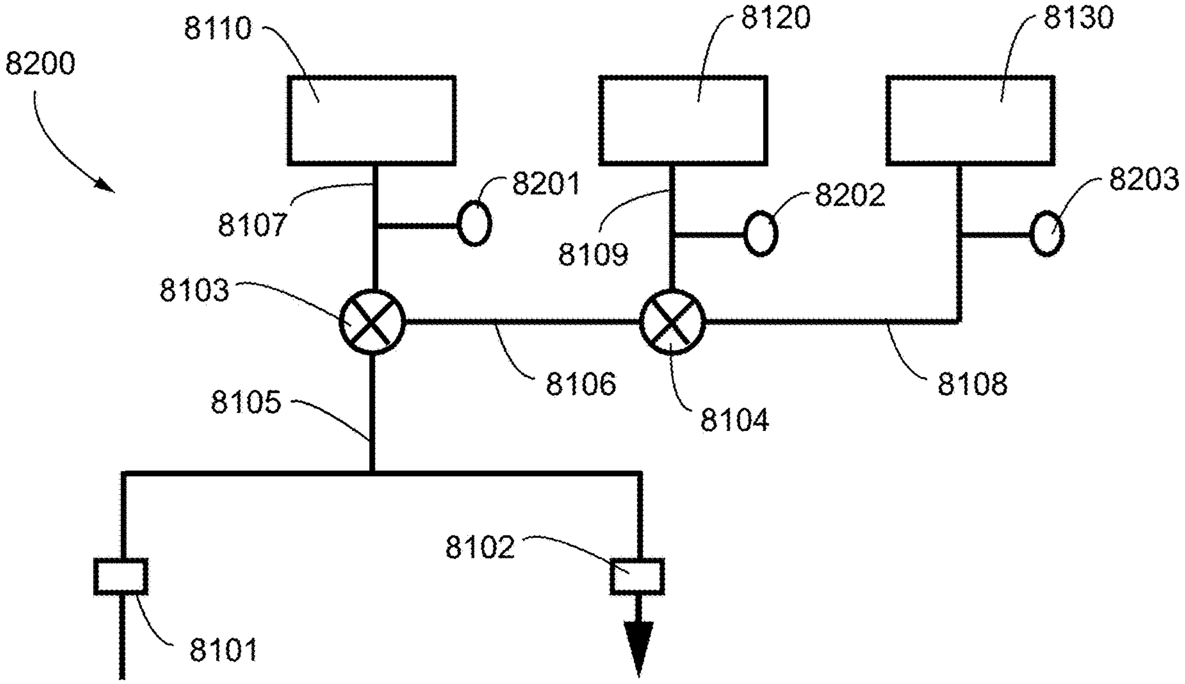
FIG. 4 is a schematic illustration of an embodiment of a fluid control system for three actuators.

FIG. 4 illustrates an embodiment of another fluid control system 8200 similar to the previously described fluid control system 8100, but is expanded to include a second control valve 8104, a third actuator 8130, a third pressure sensor 8203, and lines 8108 and 8109. To supply fluid to the third actuator 8130, inlet valve 8101 is open, outlet valve 8102 is closed, the first control valve 8103 is operated to provide fluid communication from line 8105 to line 8106 and to close fluid communication to line 8107, and the second control valve is operated to provide fluid communication from line 8106 to line 8108 and to close fluid communication to line 8109. To expand the system (not shown), additional control valves, actuators, and pressure sensors can be added in series to the embodiment of control system 8200. In one example of the embodiment of the fluid control system 8200, the first actuator 8110 may be actuator 256, the second actuator 8120 may be actuator 266, and the third actuator 8130 may be actuator 276 of the row unit 200 of FIG. 1.

In another embodiment, any of the first actuator 8110, second actuator 8120, or third actuator 8130 do not need to be on separate implements. For example, an implement, such as trench closing assembly 250, may have both an up actuator and a down actuator (not shown), and the embodiment of the fluid control system 8200 may control both the up and down actuators of that single implement 250.

Figure 5:
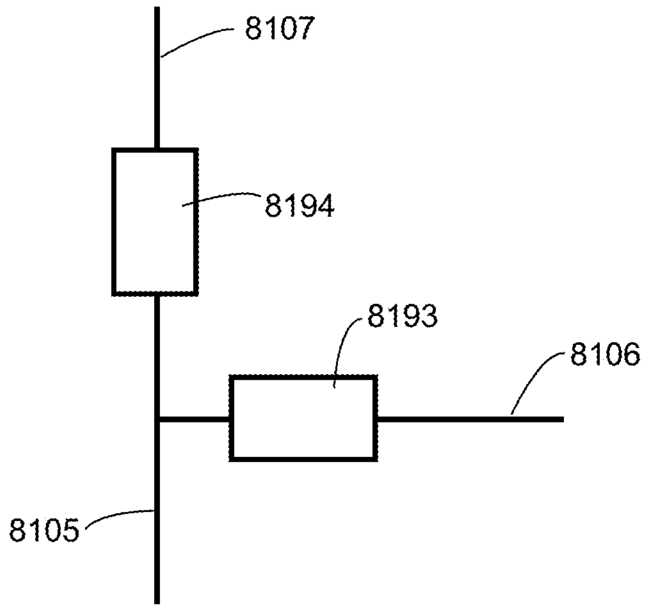
FIG. 5 is a schematic illustration of an embodiment of a control valve arrangement using two valves.

As illustrated in FIG. 5, in another embodiment applicable to either the first or second fluid control systems 8100 or 8200, any of the control valves 8103, 8104 may be replaced by two single acting valves 8193 and 8194. In such an embodiment, to provide fluid flow to or from the first actuator 8110, for example, the valve 8193 is closed, and valve 8194 is open.

Figure 6:
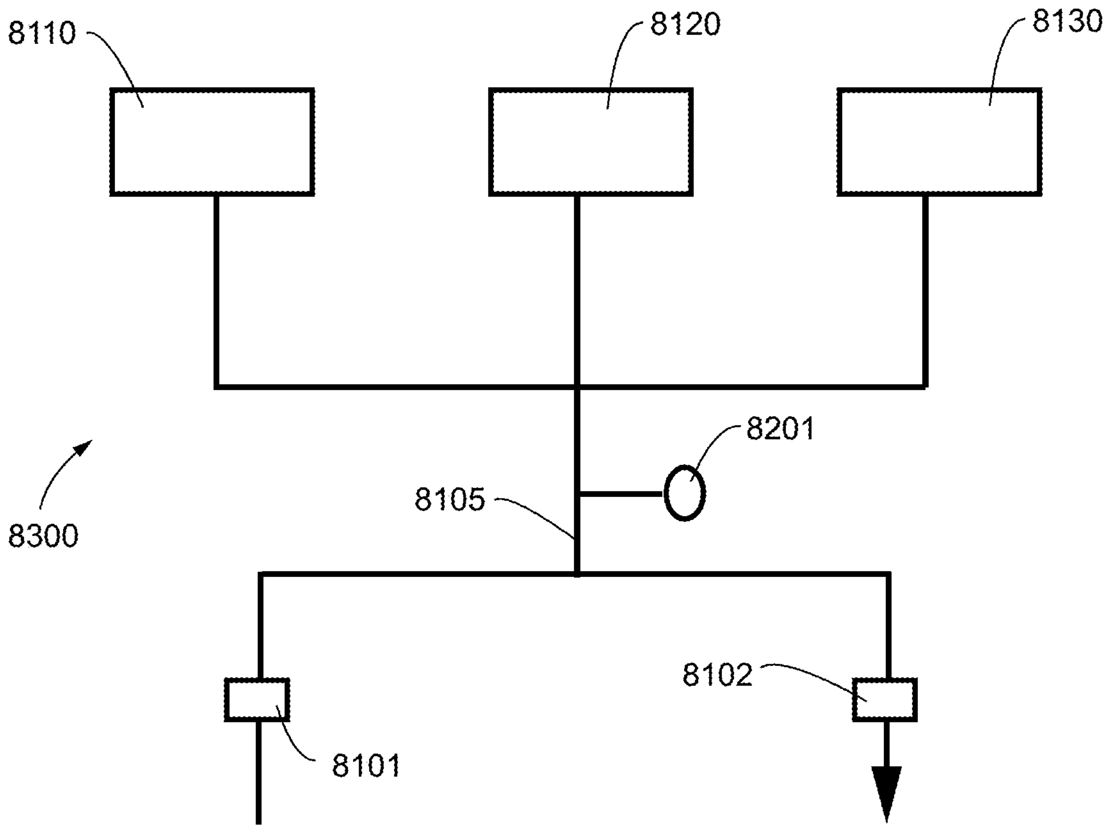
FIG. 6 is a schematic illustration of another embodiment of a fluid control system supplying fluid to a plurality of actuators.

Illustrated in FIG. 6 is another embodiment of a fluid control system 8300 capable of providing fluid to multiple actuators 8110, 8120, and 8130. In this embodiment, pressure sensor 8201 measures the pressure in line 8105, which supplies fluid to each actuator 8110, 8120, and 8130. While shown with three actuators, it should be appreciated that there can be two to any desired number of actuators. Such an embodiment could be used, for example, to provide section control of a planter with all actuators across multiple row units within the planter section being controlled to the same pressure.

Figure 7:
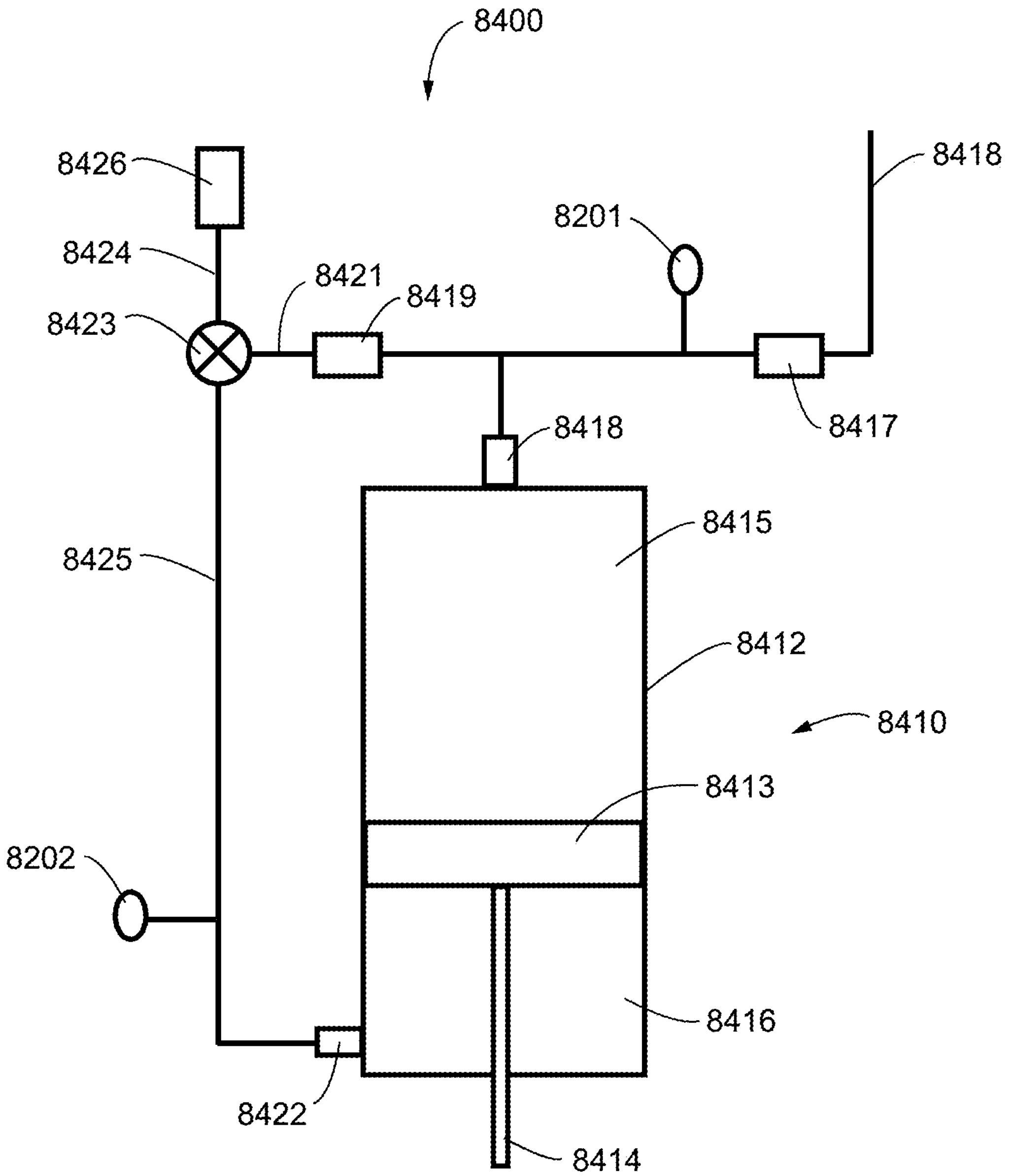
FIG. 7 is a schematic illustration of an embodiment of a fluid control system providing both up and down forces from a single supply of fluid.

In another embodiment of a fluid control system 8400 illustrated in FIG. 7, a single fluid supply supplies fluid to an actuator 8410 comprising a cylinder 8412 having a movable piston 8413 connected to a piston rod 8414. The piston 8413 separates the cylinder 8412 between a down-chamber 8415 and an up-chamber 8416. A first inlet valve 8417 disposed along inlet line 8418 controls fluid entering the fluid control system 8400. To add fluid to the down chamber 8415, a down-chamber valve 8418 disposed at the down-chamber end of the cylinder 8412 is opened and a line valve 8419 downstream of the down chamber valve 8418 is closed. Pressure in the down-chamber 8415 is measured by first pressure sensor 8201 when down-chamber valve 8418 is open, line valve 8419 is closed, and inlet valve 8417 is closed. To remove fluid from down chamber 8415, down-chamber valve 8418 is open, inlet valve 8417 is closed, line valve 8419 is open to line 8421, an up-chamber valve 8422 disposed at the up-chamber end of the cylinder 8412 is closed, a control valve 8423 downstream of the line valve 8419 and upstream of the up-chamber valve 8422 is open to line 8424 and is closed to line 8425, and outlet valve 8426 is open such that the fluid is able to flow through line 8424 to atmosphere (for gases) or is returned to the fluid source (not shown). To add fluid to up-chamber 8416, inlet valve 8417 is open, down-chamber valve 8418 is closed, line valve 8419 is open, up-chamber valve 8422 is open, and control valve 8423 is open from line 8421 to line 8425. To remove fluid from up-chamber 8416, line valve 8419 is closed, up-chamber valve 8422 is open, control valve 8423 is open from line 8425 to line 8424, and outlet valve 8426 is open such that the fluid is able to flow from line 8425 through line 8424 to atmosphere (for gases) or is returned to the fluid source (not shown). To measure pressure in up-chamber 8416 with pressure sensor 8202, line valve 8419 is closed, up-chamber valve 8422 is open, and control valve 8423 is closed to lines 8421 and 8424.

Figure 8:
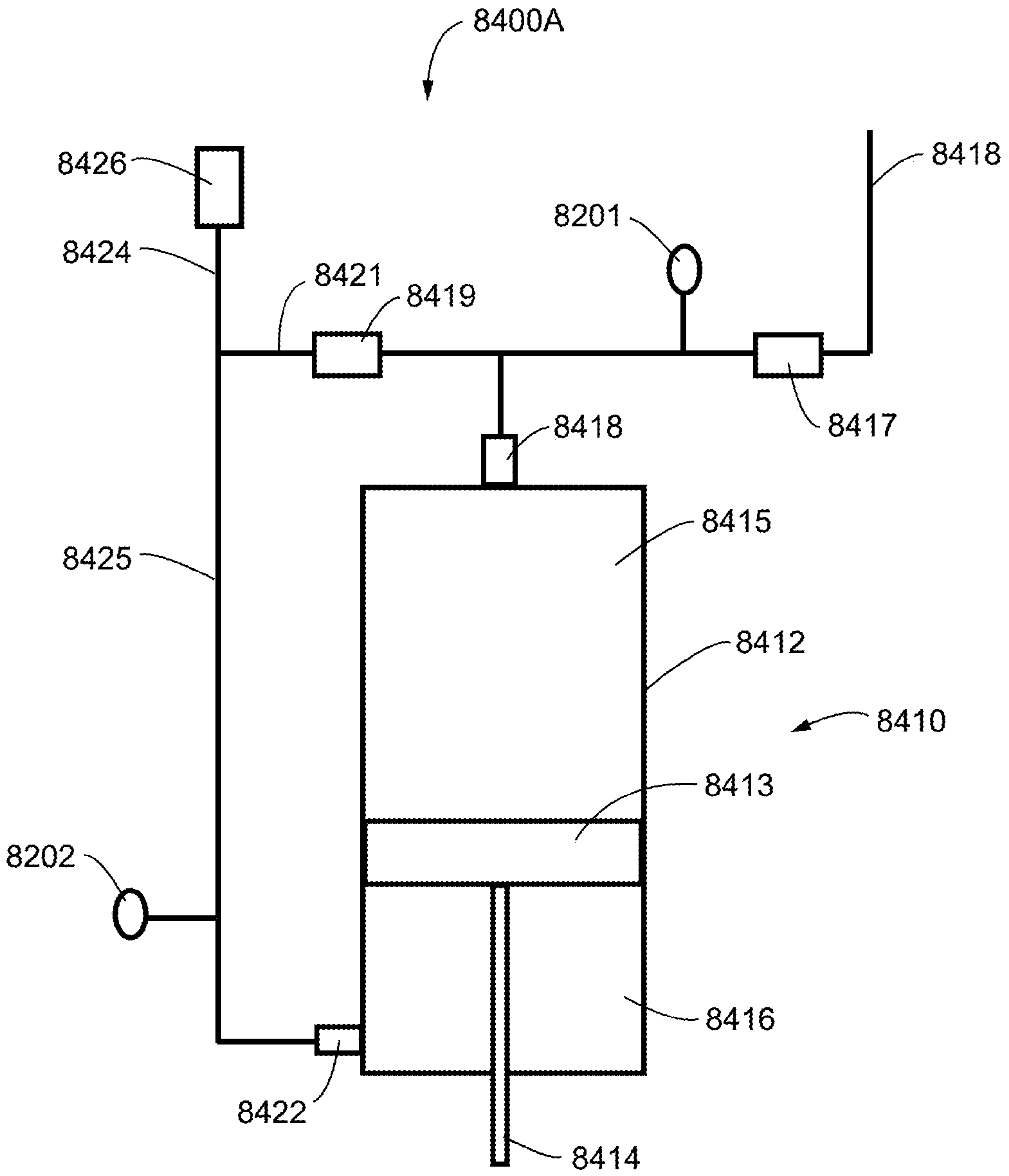
FIG. 8 is a schematic illustration of another embodiment of a fluid control system providing both up and down forces from a single supply of fluid.

FIG. 8 illustrates a fluid control system 8400A having an arrangement similar to that of the fluid control system 8400 of FIG. 7, except that in the fluid control system 8400A, the control valve 8423 is eliminated. Thus, the operation of the fluid control system 8400A is substantially the same as in the fluid control system 8400, except that the outlet valve 8426 in cooperation with line valve 8419 will open and close as needed to control the flow of fluid between lines 8424 and 8425.

In FIGS. 7 and 8, the outlet valve 8426 may be a duck-bill valve, for venting gas to atmosphere and to prevent dirt from entering line 8424. Alternatively, the outlet valve 8426 may be a solenoid valve, for venting gas to atmosphere or for returning the fluid to the fluid source.

Each of the valves described herein (e.g., 8101, 8102, 8103, 8104, 8193, 8194, 8417, 8418, 8419, 8422, 8423, 8426) and the pressure sensors (e.g., 8201, 8202, 8203) are in signal communication with monitor 300 to control the opening and closing of the valves and to measure the pressure. Alternatively, there can be a separate control with a single row network, which is described in International Publication WO2014/018717 to which the valves and pressure sensors are connected. Valves 8101, 8102, 8103, 8104, 8193, 8194, 8417, 8418, 8419, 8422, 8423, 8426 may be solenoid valves.

Any actuator described herein can be any actuator that can apply a force. Examples of actuators include, but are not limited to, pneumatic actuators, hydraulic actuators, electro-mechanical actuators, and electro-hydraulic actuators.

Downforce System for Trench Closing Assembly

Figure 9:
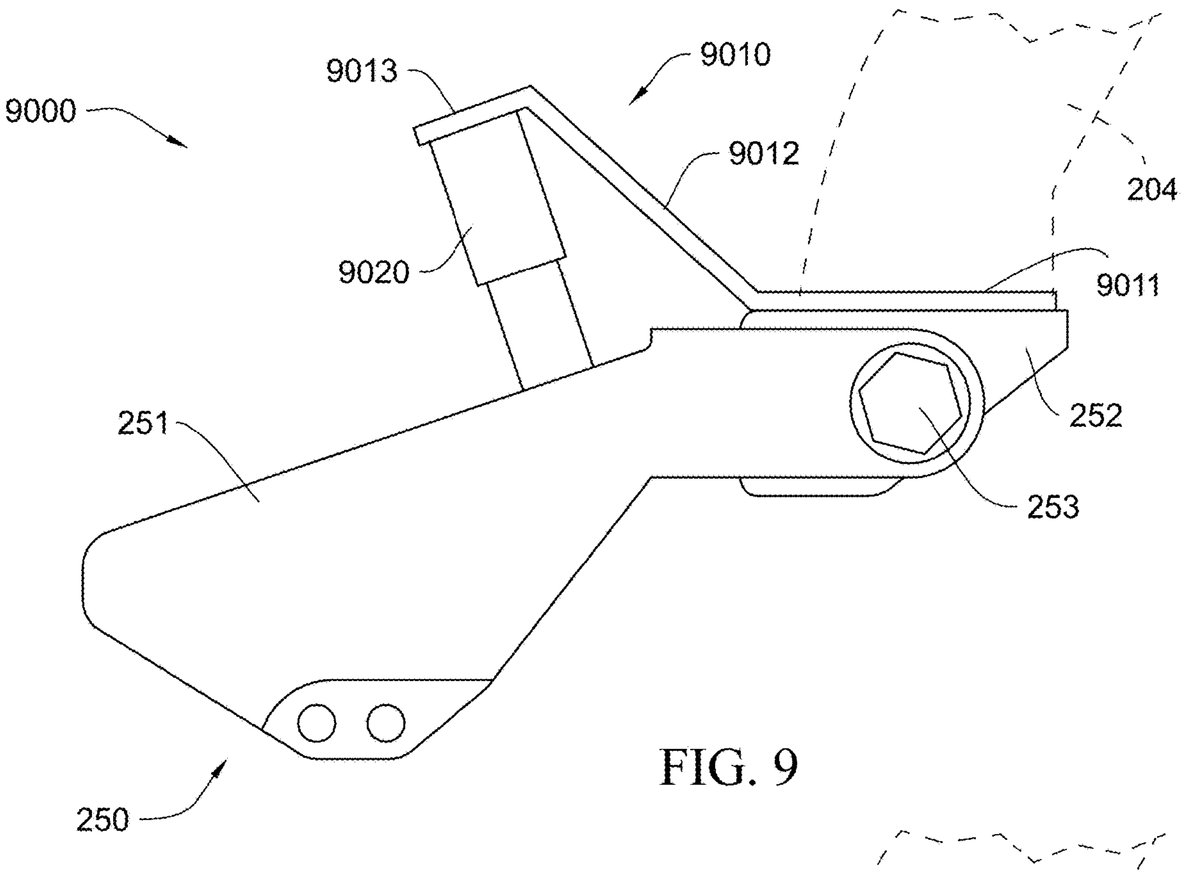
FIG. 9 is a perspective view of an embodiment of a retrofit actuator for a trench closing assembly.

FIG. 9 illustrates an embodiment of a retrofit downforce system 9000 for a trench closing assembly 250. In this embodiment, rather than the trench closing actuator 256 being secured at one end to the row unit frame 204 as illustrated in FIG. 1 and described above, the downforce system 9000 includes a bracket 9010 and an actuator 9020 disposed on the trench closing assembly 250 itself. It should be understood that reference to the actuator 9020 is used interchangeably with the trench closing assembly actuator 256 illustrated in FIG. 1 and described above, and therefore all references to the actuator 256 in this disclosure should be understood to include the actuator 9020. The bracket 9010 has a base 9011 that is disposed between a mounting bracket 252 on the closing frame member 251 of the closing assembly 250 and the row unit frame 204 (not shown in FIG. 9). In one embodiment, when the trench closing assembly 250 is attached to the row unit frame 204, the bracket 9010 is secured between the row unit frame 204 and the mounting bracket 252. Disposed upward from the base 9011 is an arm 9012. Disposed at the other end of the arm 9012, opposite the base 9011 is a plate 9013. The actuator 9020 is disposed between the plate 9013 and the trench closing frame 251. The actuation of the actuator 90200 causing it to extend or retract applies a force on the closing frame member 251 causing the frame member 251 to pivot about the pivot 253. An example of the actuator 9020 is the actuator identified by reference number 200 in U.S. Pat. No. 8,550,020, which can be controlled by the control system 100.

Figure 10:
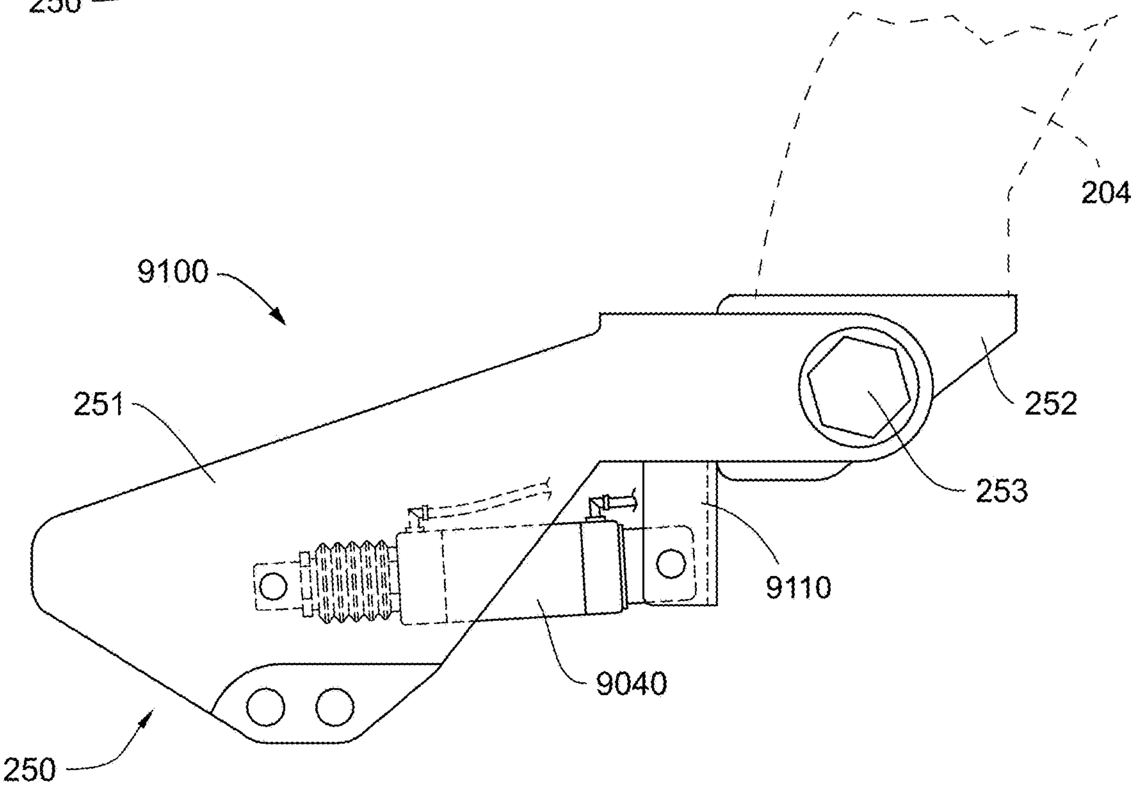
FIG. 10 is a side elevation view of an embodiment of an actuator for a trench closing assembly.

Illustrated in FIG. 10 is another embodiment of a downforce system 9100. Again, in this embodiment, rather than the trench closing actuator 256 being secured at one end to the row unit frame 204 as illustrated in FIG. 1 and described above, the downforce system 9100 includes a bracket 9110 and an actuator 9040 disposed on the trench closing assembly 250 itself. It should also be appreciated that in conventional trench closing assemblies which utilize a spring to apply downforce to the trench closing assembly, the actuator 9040 may be used in place of such a spring. Accordingly, it should be understood that reference to the actuator 9040 is used interchangeably with the trench closing assembly actuator 256 illustrated in FIG. 1 and described above, and therefore all references to the actuator 256 in this disclosure should be understood to include the actuator 9040. In this embodiment, the downforce system 9100 includes a bracket 9110 attached to and extending downwardly from the mounting bracket 252 of the trench closing assembly 250. The actuator 9040 is connected at one end to bracket 9110 and at its other end to the closing frame member 251. The actuation of the actuator 9040 causing it to extend or retract causes the closing frame member 251 to pivot about the pivot 253. An example of the actuator 9040 is the actuator identified by reference number 200 in U.S. Pat. No. 8,550,020, which can be controlled by control system 100.

Various modifications to the embodiments and the general principles and features of the apparatus, systems and methods described herein will be readily apparent to those of skill in the art. Thus, the appended claims should not be limited to the embodiments of the apparatus, systems and methods described herein and illustrated in the accompanying drawing figures, but should be accorded the widest scope consistent with the foregoing disclosure.

The invention claimed is:

1. A fluid control system for a row unit of an agricultural planter, the row unit supported by a parallel linkage from a toolbar, the row unit including a row unit frame supporting a trench opening assembly, a seed delivery system and a trench closing assembly, the trench opening assembly including an opening disc and a gauge wheel vertically movable relative to the opening disc, wherein, as the row unit travels in a forward direction of travel, the opener disc opens a seed trench in the soil surface, the seed delivery system deposits seed into the open seed trench, and the trench closing assembly closes the open seed trench with soil to cover the deposited seed, wherein the fluid control system comprises:

at least three actuators, wherein the at least three actuators are selected from an actuator group consisting of:

a downforce actuator operably supported at one end from the toolbar and operably connected at another end to the parallel linkage of the row unit, whereby actuation of the downforce actuator changes a downforce applied by the gauge wheel to the soil surface;

a depth control actuator supported at one end from the row unit frame and operably connected at another end to a rocker arm movable to limit upward travel of the gauge wheel relative to the opening disc thereby changing a depth of the seed trench, whereby actuation of the depth control actuator moves the rocker arm to change the depth of the seed trench;

a trench closing actuator supported at one end from the row unit frame and operably connected at another end to a closing assembly frame member rotatably supporting a closing wheel, the closing wheel frame member being pivotally attached to the row unit frame, whereby actuation of the trench closing actuator changes a downforce applied by the closing wheel to the soil surface;

a row cleaner actuator supported at one end from the row unit frame and operably connected at another end to a row cleaner arm rotatably supporting a row cleaner wheel, the row cleaner arm being pivotally attached to the row unit frame, whereby actuation of the row cleaner actuator changes a downforce applied by the row cleaner wheel to the soil surface; and a packer wheel actuator supported at one end from the row unit frame and operably connected at another end to a packer wheel arm rotatably supporting a packer wheel, the packer wheel arm being pivotally attached to the row unit frame, whereby actuation of the packer wheel actuator changes a downforce applied by the packer wheel to the soil surface;

a fluid source;

a fluid supply line;

a fluid outlet line;

a first multichannel control valve;

a second multichannel control valve;

an inlet valve disposed along the fluid supply line providing fluid communication between the fluid source and the first multichannel control valve;

an outlet valve disposed along the fluid outlet line providing fluid communication between the first multichannel control valve and the fluid source or to a vent;

a first actuator fluid line providing fluid communication between the first multichannel control valve and a first one of the at least three actuators;

a first pressure sensor disposed along the first actuator fluid line and configured to generate a first signal indicative of pressure in the first actuator fluid line;

a first control valve fluid line providing fluid communication between the first multichannel control valve and the second multichannel control valve;

a second actuator fluid line providing fluid communication between the second multichannel control valve and a second one of the at least three actuators;

a second pressure sensor disposed along said depth control actuator fluid line and configured to generate a second signal indicative of pressure in the second actuator fluid line;

a third actuator fluid line providing fluid communication between the second control valve and a third one of the at least three actuators;

a third pressure sensor disposed along said third actuator fluid line and configured to generate a third signal indicative of pressure in the third actuator fluid line;

a monitor in signal communication with the inlet valve, the outlet valve, the first multichannel control valve, the second multichannel control valve, the first pressure sensor, the second pressure sensor and the third pressure sensor;

whereby, the monitor is configured to control opening and closing of the inlet valve, the outlet valve, the first multichannel control valve and the second multichannel control valve to control actuation of each of the at least three actuators based on the first signal, the second signal and the third signal.

2. The fluid control system of claim 1, wherein the fluid control system further comprises:

a fourth actuator, wherein the fourth actuator is one of the group of actuators different from the at least three actuators;

a third multichannel control valve;

a second control valve fluid line providing fluid communication between the second multichannel control valve and the third multichannel control valve;

a fourth actuator fluid line providing fluid communication between the third multichannel control valve and the fourth actuator;

a fourth pressure sensor disposed along the fourth actuator fluid line and configured to generate a fourth signal indicative of pressure in the fourth actuator fluid line;

wherein the monitor is further in signal communication with the third multichannel control valve and the fourth pressure sensor;

whereby, the monitor is further configured to control opening and closing of the inlet valve, the outlet valve, the first multichannel control valve, the second multichannel control valve and the third multichannel control valve to control actuation of each of the at least three actuators and the fourth actuator based on the first signal, the second signal, the third signal and the fourth signal.

3. The fluid control system of claim 2, wherein the fluid control system further comprises:

a fifth actuator, wherein the fifth actuator is one of the group of actuators different from the at least three actuators and the fourth actuator;

a fourth multichannel control valve;

a third control valve fluid line providing fluid communication between the third multichannel control valve and the fourth multichannel control valve;

a fifth actuator fluid line providing fluid communication between the fourth multichannel control valve and the fifth actuator;

a fifth pressure sensor disposed along the fifth actuator fluid line and configured to generate a fifth signal indicative of a pressure in the fifth actuator fluid line;

wherein the monitor is further in signal communication with the fourth multichannel control valve and the fifth pressure sensor;

whereby, the monitor is further configured to control opening and closing of the inlet valve, the outlet valve, the first multichannel control valve, the multichannel second control valve, the third multichannel control valve and the fourth multichannel control valve to control actuation of each of the at least three actuators, the fourth actuator and the fifth actuator based on the first signal, the second signal, the third signal, the fourth signal and the fifth signal.

4. The fluid control system of claim 1, wherein the first actuator of the at least three actuators includes a down chamber and a lift chamber, the fluid control system further comprising:

a first down chamber valve in fluid communication with the down chamber of the first actuator;

a first down chamber fluid line in fluid communication with the fluid supply line downstream of the inlet valve and providing fluid communication to the first down chamber valve;

a first down chamber pressure sensor disposed and configured to generate a first down chamber pressure signal indicative of a pressure in the first down chamber fluid line;

a first line valve along the first down chamber fluid line downstream of the first down chamber valve;

a first lift chamber valve in fluid communication with the lift chamber of the first actuator and the first actuator fluid line;

wherein the monitor is further in signal communication with the first down chamber valve, the first lift chamber valve, the first line valve and the first down chamber pressure sensor;

whereby the monitor is further configured to control opening and closing of the first down chamber valve, the first lift chamber valve and the first line valve based on the first down chamber pressure signal.

5. The fluid control system of claim 1, wherein the second actuator of the at least three actuators includes a down chamber and a lift chamber, the fluid control system further comprising:

a second down chamber valve in fluid communication with the down chamber of the second actuator;

a second down chamber fluid line in fluid communication with the first control valve line and providing fluid communication to the second down chamber valve;

a second down chamber pressure sensor disposed and configured to generate a second down chamber pressure signal indicative of a pressure in the second down chamber fluid line;

a second line valve along the second down chamber fluid line downstream of the second down chamber valve;

a second lift chamber valve in fluid communication with the lift chamber of the second actuator and the second actuator fluid line;

wherein the monitor is further in signal communication with the second down chamber valve, the second lift chamber valve, the second line valve and the second down chamber pressure sensor;

whereby the monitor is further configured to control opening and closing of the second down chamber valve, the second lift chamber valve and the second line valve based on the second down chamber pressure signal.

6. The fluid control system of claim 1, wherein the third actuator of the at least three actuators includes a down chamber and a lift chamber, the fluid control system further comprising:

a third down chamber valve in fluid communication with the down chamber of the third actuator;

a third down chamber fluid line in fluid communication with the third actuator fluid line and providing fluid communication to the third down chamber valve;

a third down chamber pressure sensor disposed and configured to generate a third down chamber pressure signal indicative of a pressure in the third down chamber fluid line;

a third line valve along the third down chamber fluid line downstream of the third down chamber valve;

a third lift chamber valve in fluid communication with the lift chamber of the third actuator and the third actuator fluid line;

wherein the monitor is further in signal communication with the third down chamber valve, the third lift chamber valve, the third line valve and the third down chamber pressure sensor;

whereby the monitor is further configured to control opening and closing of the third down chamber valve, the third lift chamber valve and the third line valve based on the third down chamber pressure signal.

7. The fluid control system of claim 4, wherein the second actuator of the at least three actuators includes a down chamber and a lift chamber, the fluid control system further comprising:

a second down chamber valve in fluid communication with the down chamber of the second actuator;

a second down chamber fluid line in fluid communication with the first control valve line and providing fluid communication to the second down chamber valve;

a second down chamber pressure sensor disposed and configured to generate a second down chamber pressure signal indicative of a pressure in the second down chamber fluid line;

a second line valve along the second down chamber fluid line downstream of the second down chamber valve;

a second lift chamber valve in fluid communication with the lift chamber of the second actuator and the second actuator fluid line;

wherein the monitor is further in signal communication with the second down chamber valve, the second lift chamber valve, the second line valve and the second down chamber pressure sensor;

whereby the monitor is further configured to control opening and closing of the second down chamber valve, the second lift chamber valve and the second line valve based on the second down chamber pressure signal.

8. The fluid control system of claim 4, wherein the third actuator of the at least three actuators includes a down chamber and a lift chamber, the fluid control system further comprising:

a third down chamber valve in fluid communication with the down chamber of the third actuator;

a third down chamber fluid line in fluid communication with the third actuator fluid line and providing fluid communication to the third down chamber valve;

a third down chamber pressure sensor disposed and configured to generate a third down chamber pressure signal indicative of a pressure in the third down chamber fluid line;

a third line valve along the third down chamber fluid line downstream of the third down chamber valve;

a third lift chamber valve in fluid communication with the lift chamber of the third actuator and the third actuator fluid line;

wherein the monitor is further in signal communication with the third down chamber valve, the third lift chamber valve, the third line valve and the third down chamber pressure sensor;

whereby the monitor is further configured to control opening and closing of the third down chamber valve, the third lift chamber valve and the third line valve based on the third down chamber pressure signal.

9. The fluid control system of claim 7, wherein the third actuator of the at least three actuators includes a down chamber and a lift chamber, the fluid control system further comprising:

a third down chamber valve in fluid communication with the down chamber of the third actuator;

a third down chamber fluid line in fluid communication with the third actuator fluid line and providing fluid communication to the third down chamber valve;

a third down chamber pressure sensor disposed and configured to generate a third down chamber pressure signal indicative of a pressure in the third down chamber fluid line;

a third line valve along the third down chamber fluid line downstream of the third down chamber valve;

a third lift chamber valve in fluid communication with the lift chamber of the third actuator and the third actuator fluid line;

wherein the monitor is further in signal communication with the third down chamber valve, the third lift chamber valve, the third line valve and the third down chamber pressure sensor;

whereby the monitor is further configured to control opening and closing of the third down chamber valve, the third lift chamber valve and the third line valve based on the third down chamber pressure signal.

10. The fluid control system of claim 2, wherein the fourth actuator includes a down chamber and a lift chamber, the fluid control system further comprising:

a fourth down chamber valve in fluid communication with the down chamber of the fourth actuator;

a fourth down chamber fluid line in fluid communication with the fourth actuator fluid line and providing fluid communication to the fourth down chamber valve;

a fourth down chamber pressure sensor disposed and configured to generate a fourth down chamber pressure signal indicative of a pressure in the fourth down chamber fluid line;

a fourth line valve along the fourth down chamber fluid line downstream of the fourth down chamber valve;

a fourth lift chamber valve in fluid communication with the lift chamber of the fourth actuator and the fourth actuator fluid line;

wherein the monitor is further in signal communication with the fourth down chamber valve, the fourth lift chamber valve, the fourth line valve and the fourth down chamber pressure sensor;

whereby the monitor is further configured to control opening and closing of the fourth down chamber valve, the fourth lift chamber valve and the fourth line valve based on the fourth down chamber pressure signal.

11. The fluid control system of claim 3, wherein the fifth actuator includes a down chamber and a lift chamber, the fluid control system further comprising:

a fifth down chamber valve in fluid communication with the down chamber of the fifth actuator;

a fifth down chamber fluid line in fluid communication with the fifth actuator fluid line and providing fluid communication to the fifth down chamber valve;

a fifth down chamber pressure sensor disposed and configured to generate a fifth down chamber pressure signal indicative of a pressure in the fifth down chamber fluid line;

a fifth line valve along the fifth down chamber fluid line downstream of the fifth down chamber valve;

a fifth lift chamber valve in fluid communication with the lift chamber of the fifth actuator and the fifth actuator fluid line;

wherein the monitor is further in signal communication with the fifth down chamber valve, the fifth lift chamber valve, the fifth line valve and the fifth down chamber pressure sensor;

whereby the monitor is further configured to control opening and closing of the fifth down chamber valve, the fifth lift chamber valve and the fifth line valve based on the fifth down chamber pressure signal.

* * * * *